United States Patent [19]
Dao

[11] Patent Number: 5,594,848
[45] Date of Patent: Jan. 14, 1997

[54] METHOD AND APPARATUS FOR EFFICIENTLY DETERMINING LINE SEGMENTS WITHIN A WINDOW USING ITERATIVE HALVING

[75] Inventor: Giang H. Dao, Houston, Tex.

[73] Assignee: Compaq Computer Corporation, Houston, Tex.

[21] Appl. No.: 17,778

[22] Filed: Feb. 16, 1993

[51] Int. Cl.$^6$ .................................................. G06T 15/30
[52] U.S. Cl. ............................................................ 395/134
[58] Field of Search ........................... 395/128, 134, 395/139, 141, 143, 157

[56] References Cited

U.S. PATENT DOCUMENTS

| | | | |
|---|---|---|---|
| 4,213,252 | 7/1980 | Sullivan et al. | 395/125 X |
| 4,623,880 | 11/1986 | Bresenham et al. | 345/24 |
| 5,077,678 | 12/1991 | Gutlag et al. | 395/157 |
| 5,260,697 | 11/1993 | Barrett et al. | 345/173 |
| 5,283,860 | 2/1994 | Einkauf et al. | 395/134 |
| 5,287,440 | 2/1994 | Yamaashi et al. | 395/134 |
| 5,369,741 | 11/1994 | Hartog et al. | 395/143 |

OTHER PUBLICATIONS

Foley et al., "Fundamentals of Interactive Computer Graphics", Addison–Wesley Publishing Company (1982), pp. 144–151.
Foley et al., "Computer Graphics Principles and Pratice", Addison–Wesley Publishing Company (1990), pp. 112–124.

*Primary Examiner*—Mark K. Zimmerman
*Assistant Examiner*—Anton W. Fetting
*Attorney, Agent, or Firm*—Vinson & Elkins L.L.P.

[57] ABSTRACT

A method and apparatus is provided for efficiently determining scissored line segments within a window, without the use of long division calculations. Edges are examined to determine whether an intersection exists between the line and the edge. If so, endpoints of the edge are iteratively halved to find the point of intersection. A Bresenham error term for the point of intersection may be easily determined once the point of intersection is found.

30 Claims, 3 Drawing Sheets

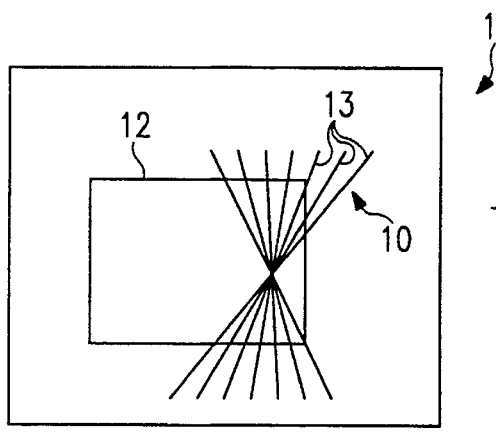
FIG. 1
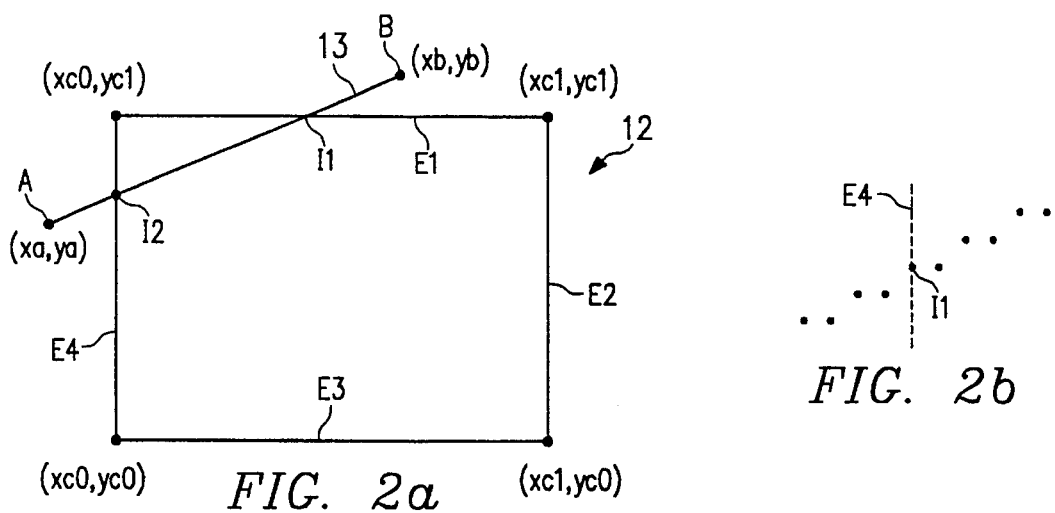
FIG. 2a
FIG. 2b
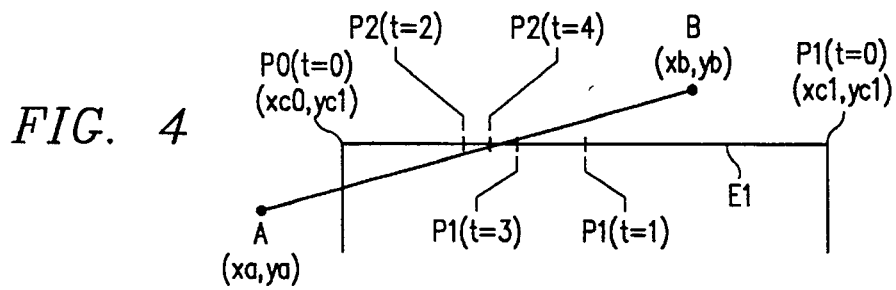
FIG. 4
FIG. 5a
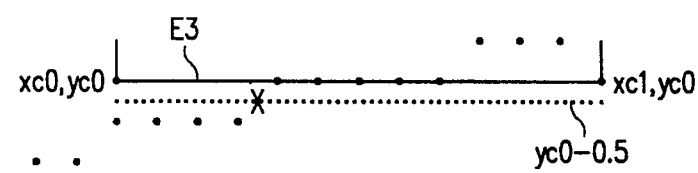
FIG. 5b

METHOD AND APPARATUS FOR EFFICIENTLY DETERMINING LINE SEGMENTS WITHIN A WINDOW USING ITERATIVE HALVING

TECHNICAL FIELD OF THE INVENTION

This invention is related in general to computer systems, and more particularly to a line draw engine.

BACKGROUND OF THE INVENTION

In order to communicate with a user, a computer must be able to output information to a display. In a graphics system, the display is defined by an array of pixels. For example, in a standard-mode VGA (Video Graphics Adapter) system, the screen is addressed as an array of 640×480 pixels. Each pixel on the display may be set to a desired color from a defined palette. Typically 16 or 256 color palettes are supported. The number of pixels which may be displayed is defined by the graphic subsystem. Typical VGA modes support 640×480, 800×600, and 1024×768 resolutions. VGA modes with resolution greater than 640×480 are generally referred to as "super VGA".

Many of today's application programs are graphics intensive. For example, a computer-aided design program, such as AUTOCAD by AutoDesk, Inc., Sauseleto, Calif., may spend a substantial amount of time drawing a figure to the screen. In some cases, even a small change in the drawing will require the entire drawing to be redrawn. Consequently, the ability of the graphics processor to draw lines quickly becomes of critical importance.

The problems associated with line drawing have been well documented for a number of years. Many of these problems are addressed in an article "Ambiguity in Incremental Line Rastering", by Jack E. Bresenham, IEEE Computer Graphics & Applications May, 1987, which is incorporated by reference herein. The Bresenham article describes problems in drawing a line using an array of pixels, since lines having real values between two discrete pixels will have to approximated using one pixel or the other. Because of the inaccuracies inherent in approximating the line, issues concerning the retraceability of lines and the handling of symmetric figures made up of polylines become important. Consequently, the flexibility of a graphics processor, i.e., the ability of the graphics processor to facilitate modification of the line drawing parameters is highly desirable.

In many instances, for example, where a computer uses windowing software, such as MICROSOFT WINDOWS (from Microsoft Corporation of Redmond, Wash.), an image 10 will be cropped to fit within a rectangular port or "window" 12 of a display 14, as shown in FIG. 1. As the image is cropped, the screen is updated, requiring each line of the image to be redrawn. For example, in FIG. 1, each line 13 which of the image which intersects an edge of the window 12 must be redrawn such that only the points within the window 12 (i.e., the scissored points) are displayed. To redraw the lines, the end points of the scissored line must be recalculated and the lines regenerated. While this example assumes that the image is to be cropped to the portion inside the window, it may be desirable to crop the image to that portion outside the window 12.

A number of methods for redrawing the lines within a window have been developed. The most popular method, the Cohen-Sutherland method, uses both multiplication and division to determine which lines are clipped. If a large number of lines are present in the image, which is very likely in a CAD environment, this method can be very time consuming. Further, the divisions required by the Cohen-Sutherland method (and other similar methods) make the method difficult to implement in hardware.

Therefore, a need has arisen in the industry for a high-speed circuit for drawing lines within a boundary of a rectangle which can be implemented in hardware or software.

SUMMARY OF THE INVENTION

In accordance with the present invention, a method and apparatus for drawing lines relative to a predetermined window is provided which eliminates problems associated with prior method and devices.

In the present invention, a line segment is drawn responsive to a predefined window by determining whether one or more edges of the window intersect the line and iterating along an edge to determine the point of intersection. If one or more edges are determined to intersect the line, the line is then drawn using the point of intersection as an end point.

The present invention provides significant advantages over the prior art. First, the method can be implemented without divisions other than divisions by two, which may be performed by a shift register. Hence, complicated division circuitry or division algorithms are unnecessary. Further, the Bresenham error term at the point of intersection can be easily determined.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates the desired application of the present invention where lines contained within a predefined rectangle are redrawn;

FIG. 2a illustrates a single line intersecting a predefined rectangle;

FIG. 2b illustrates a detailed view of the line intersecting an edge of the rectangle;

FIG. 4 illustrates the iterative process of determining an intersection point on an edge of the predefined rectangle;

FIGS. 5a–c illustrate the biasing of the parameters to include multiple scissored lines disposed upon an edge;

DETAILED DESCRIPTION OF THE INVENTION

The preferred embodiment of the present invention and its advantages are best understood by referring to FIGS. 1–7 of the drawings, like numerals being used for like and corresponding parts of the various drawings.

FIG. 2a illustrates a line 13 from point A (at coordinates xa, xb) to point B (at xb,yb) intersecting two edges (E1 and E4) of a window 12 at points I1 and I2, respectively. The coordinates of the corners of the window 12 are (xc0,yc0), (xc1,yc0), (xc1,yc1) and (xc0,yc1). Thus, edge E1 is disposed between points (xc0,yc1) and (xc1,yc1), edge E2 is disposed between points (xc1,yc1) and (xc1,yc0), edge E3 is disposed between points (xc0,yc0) and (xc1,yc0) and edge E4 is disposed between points (xc0,yc0) and (xc0,yc1).

To redraw the image in accordance with the defined window (for purposes of illustration, it will be assumed that the portion inside the window is the portion to be redrawn), the points of intersection must be determined. As shown in FIG. 2b, the line 13 is actually composed of a series of adjacent pixels. Using the Bresenham method of drawing lines (see "Ambiguity in Incremental Line Rastering", by Jack E. Bresenham, cited hereinabove), a line is drawn by stepping in the major direction for each point; the only decision is whether a step is to be made in the minor direction as well, thereby producing a diagonal step. The major and minor directions are dependent upon the octant associated with a line; by convention, the present invention is discussed in connection with first octant lines where appropriate; application to lines in other octants would be obvious to one skilled in the art.

Figure 3:
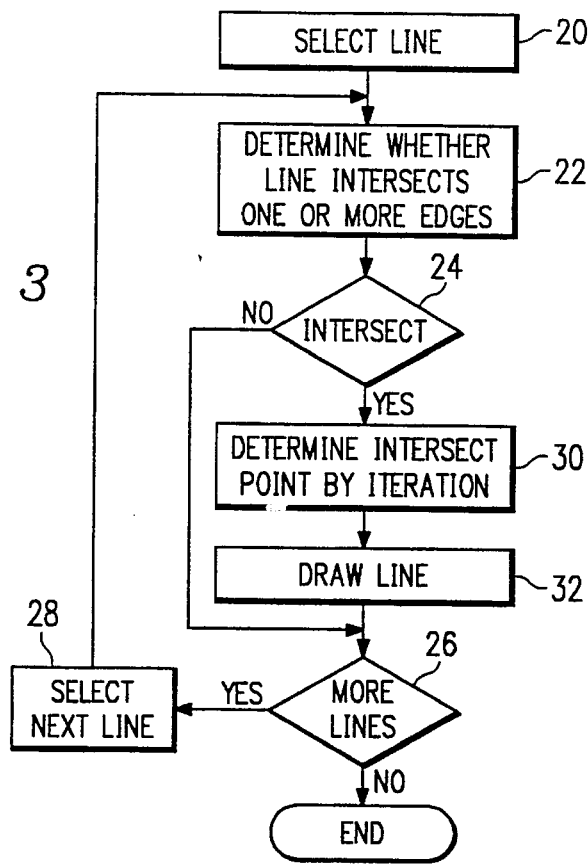
FIG. 3 illustrates a flow chart describing the general operation of the present invention.

FIG. 3 illustrates a flow chart outlining the major steps of performing a screen redraw using the preferred embodiment of the present invention. In block 20, a line 13 of image 10 is selected for redraw. In block 22, it is determined whether or not one or more of the edges (E1–E4) of the window 12 are intersected by the line 13. If it is determined in decision block 24 that the line 13 does not intersect an edge, then it is determined in decision block 26 whether there are more lines to be drawn. If so, the next line of the image is selected in block 28 and the flow returns to block 22. Although not shown in FIG. 3, if line 13 is within the window 12 but does not intersect an edge, it may be drawn prior to selecting the next line.

If an intersection is found in decision block 24, then the point of intersection is determined in block 30 using an iterative technique, described in greater detail in connection with FIG. 6. The scissored line (the line composed of the scissor points) is then drawn in block 32. If there are more lines of image 10 to be cropped in decision block 26, then the next line is selected in block 28 and flow returns to block 22.

In the preferred embodiment, the following expression is used to determine whether a line 13 intersects an edge:

$$F(x,y)=2*(yb-ya)*(x-xa)-2*(xb-xa)*(y-ya)$$

This expression for each point (x,y) is proportional to the distance between point (x,y) and line AB having endpoints (xa,ya) and (xb,yb). F(x,y) has positive values for points below the line, negative values for points above the line and a value of 0 for points on the line.

The two endpoints of each side of the window are tested to determine whether they are on opposite sides of the line 13 by evaluating the expression with the window coordinates. Hence:

$$F(xc0,yc0)=2*(yb-ya)*(xc0-xa)-2*(xb-xa)*(yc0-ya) \quad (1)$$

$$F(xc1,yc0)=2*(yb-ya)*(xc1-xa)-2*(xb-xa)*(yc0-ya) \quad (2)$$

$$F(xc0,yc1)=2*(yb-ya)*(xc0-xa)-2*(xb-xa)*(yc1-ya) \quad (3)$$

$$F(xc1,yc1)=2*(yb-ya)*(xc1-xa)-2*(xb-xa)*(yc1-ya) \quad (4)$$

For example, if the signs of expressions (3) and (4) are opposites, then the line 13 could intersect edge E1. Each edge is tested to see if the signs of the expressions associated with its corner coordinates are opposite. It should be noted that only four quantities are needed to evaluate the expression for all four edges:

Dxc0=(yb–ya)*(xc0–xa)

Dxc1=(yb–ya)*(xc1–xa)

Dyc0=(xb–xa)*(yc0–ya)

Dyc1=(xb–xa)*(yc1–ya)

Using these four quantities, four decision variables (one for each corner of the window 12) can be calculated:

Dxc0yc0=2*(Dxc0–Dyc0)

Dxc0yc1=2*(Dxc0–Dyc1)

Dxc1yc0=2*(Dxc1–Dyc0)

Dxc1yc1=2*(Dxc1–Dyc1)

If Dxc0yc1 and Dxc1yc1 have opposite signs, then edge E1 intersects the line if yc1 is between ya and yb. If Dxc1yc0 and Dxc1yc1 have opposite signs, then edge E2 intersects the line if xc1 is between xa and xb. If Dxc0yc0 and Dxc1yc0 have opposite signs, then edge E3 intersects the line if yc0 is between ya and yb. If Dxc0yc0 and Dxc0yc1 have opposite signs, then edge E4 intersects the line if xc0 is between xa and xb.

The initial Bresenham error for point A is defined as e=e0=2*(yb–ya)–(xb–xa). Each increment in x adds 2*(yb–ya) to the error term and each unit in y subtracts 2*(xb–xa) from the error term. Thus, for any point (x,y), the Bresenham error term is:

$$e=e0+2*(yb-ya)*(x-xa)-2*(xb-xa)*(y-ya)$$

This value is different from the decision variables in expressions (1) through (4) by the value of the initial error e0.

Once the intersectability of an edge of the window 12 has been determined, the intersection coordinates can be found by successive halving interpolation starting with the coordinates of the endpoints of the edge and their associated decision variables. This method is best described in connection with FIG. 4.

On the initial iteration (t=0), the endpoints of the edge are chosen as initial estimates of possible points of intersection (P0(t=0) and P1(t=0)). The midpoint between P0 an P1 replaces the possible point of intersection furthest from the line 13. Hence, the possible point of intersection with the decision variable having the largest magnitude is replaced by the midpoint and the decision variable is recalculated. In FIG. 4, P1(t=0) is further from the line 13 than is P0(t=0), hence P1 is replaced by the midpoint (labeled P0(t=1)). On the second iteration, P0(t=0) is further from the midpoint than is P1(t=1), hence P0(t=0) is replaced by the midpoint between P0(t=0) and P1(t=1). This point is labeled in FIG. 4 as P0(t=2). On the third iteration, P1(t=1) is further from the midpoint than is P0(t=2), hence P1(t=1) is replaced by the midpoint between P0(t=2) and P1(t=1). This point is labeled in FIG. 4 as P1(t=3). On the fourth iteration, P0(t=0) is further from the midpoint than is P1(t=3), hence P0(t=2) is replaced by the midpoint between P0(t=2) and P1(t=3). This point is labeled in FIG. 4 as P0(t=4).

The iterations continue until either one of the possible points of intersection P0 or P1 have a decision variable equal to zero, indicating that the possible point of intersection is on the line 13, or if the points P0 and P1 are within one step of each other, indicating that further resolution cannot be obtained. In the second instance, the point with the decision variable having the smaller magnitude is chosen. The decision variable of the point determined to be the point of intersection is added to e0 to determine the Bresenham error term at the point of intersection.

The midpoint calculation may be performed by adding the appropriate coordinates, the x-coordinates for the upper and lower edges and the y-coordinates for the right and left side edges, and right shifting the sum by one bit. Hence, no division is necessary. It should be noted that the calculation of the decision variables can be determined for the midpoint by adding the associated decision variables of the endpoints and right-shifting the sum by one bit as follows:

$$F((x0+x1)/2,y)=(F(x0,y)+F(x1,y))/2$$

or $$F(x,(y0+y1)/2)=(F(x,y0)+F(x,y1))/2$$

where (x0,y0) are the coordinates of P0 and (x1,y1) are the coordinates of P1.

If the midpoint is rounded down (i.e., the least significant bit of the sum is a "1", which is right-shifted due to the division by 2), the associated decision variable is corrected by subtracting (yb−ya) where the associated edge is parallel to the x-axis or by adding (xb−xa) where the associated edge is parallel to the y-axis. The interpolated decision variable never has to round up or down.

Figure 5C:
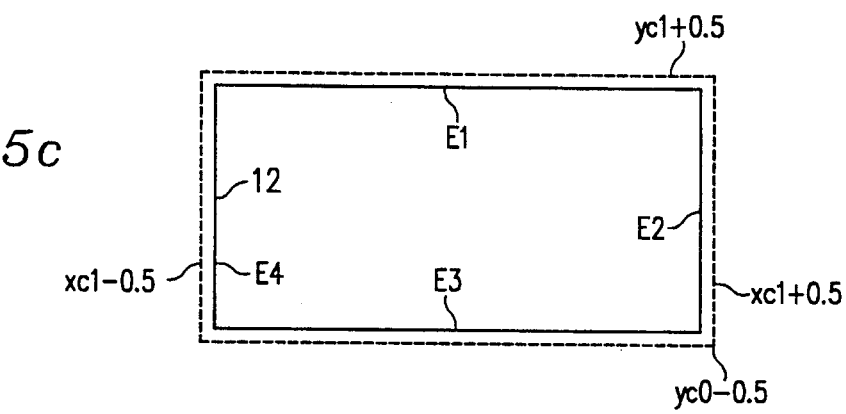

One refinement of the method described above is shown in FIGS. 5a–c. In FIG. 5a, a line 13 has multiple scissor points which lie on an edge. All of these points should be included in the redrawn line. The method described above may result in the determination of a point of intersection which would be an interior point, thus resulting in an endpoint for the scissor line that ignores some of the scissor points.

As shown in FIG. 5b, the edge can be biased such that the first point to cross over to the edge can be identified. In FIG. 5b, the biased edge to replace E3 has coordinates (xc0,yc0−0.5) and (xc1,yco−0.5). As shown in FIG. 5c, biased edges are shown for the entire window: E1 is replaced by a line having endpoint coordinates (xc0,yc1+0.5) and (xc1,yc1+0.5). E2 is replaced by an edge having coordinates (xc1+0.5,y1) and (xc1+0.5,y0). E4 is replaced by an edge having coordinates (xc0−0.5,y1) and (xc0−0.5,y0).

Figure 6:
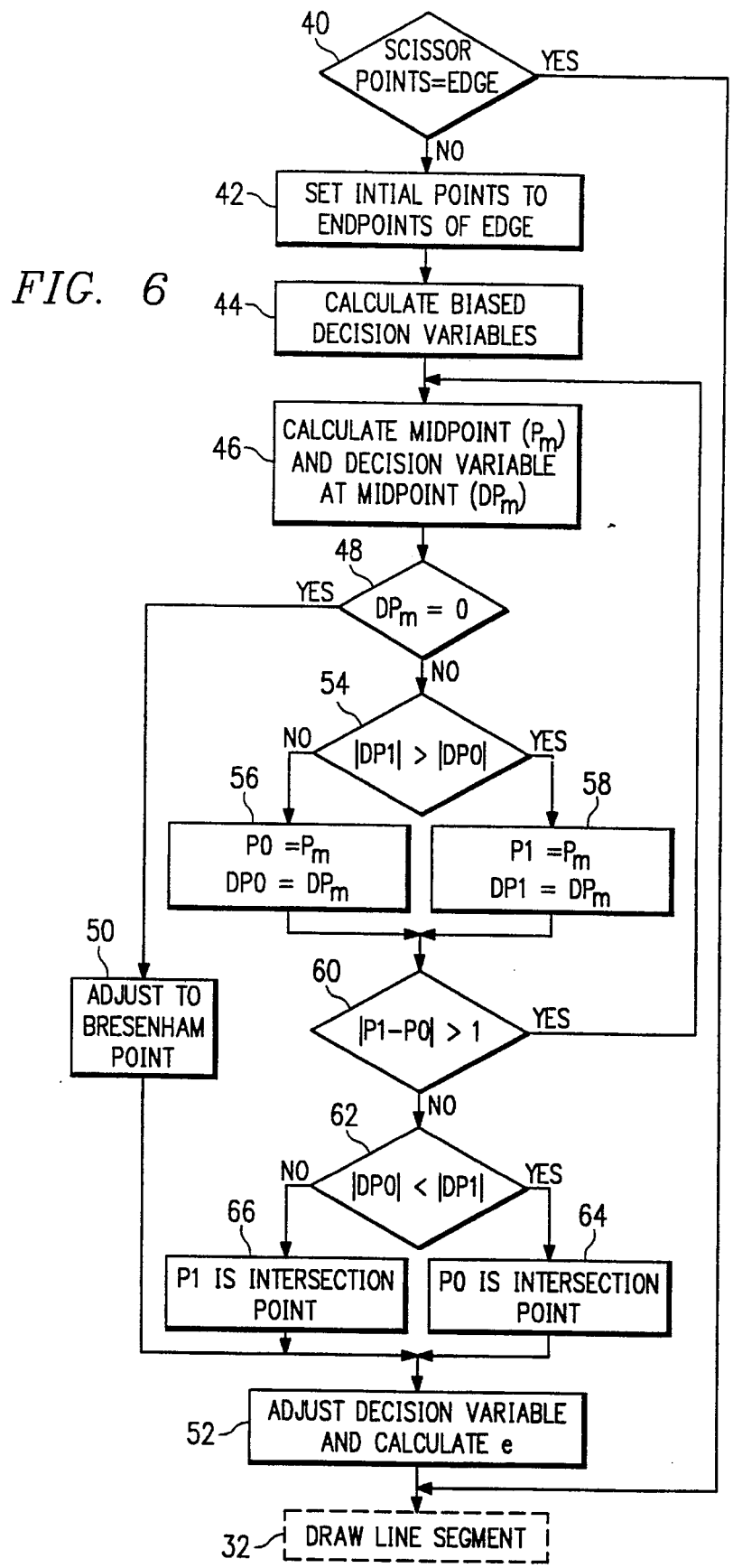
FIG. 6 illustrates a flow chart illustrating the operation of the iterative determination of intersection points on an edge.

FIG. 6 is a flow chart describing the preferred embodiment for determining the point of intersection such that all scissor points are included. In block 40, the line 13 is examined to see if all points fall on the edge. This can be determined examining the decision variables at the corner points. If the decision variables for both corner points associated with the edge are positive and less than xb−xa (for the lower edge), then the whole edge is scissor points. Flow is then directed to block 32 (of FIG. 3) and the line is drawn, since no further calculations are necessary. The examination for other edges is similar. For the upper edge, the decision variables associated with the corner coordinates are examined to determine whether both are negative and greater than −(xb−xa). For the right edge, the decision variables associated with the corner coordinates are examined to determine whether both are negative and greater than −(yb−ya). For the left edge, the decision variables associated with the corner coordinates are examined to determine whether both are positive and less than (yb−ya).

If, in decision block 40, if it is determined that less than the entire edge is composed of scissor points, then the initial points of possible intersection (P0 and P1) are set to the endpoints of the edge in block 42. The biased decision variables (DP0 and DP1) are calculated in block 44. To calculate the biased decision variables, xb−xa is added to the decision variables for the lower edge or xb−xa is subtracted for the decision variables for the upper edge. This can be shown for the upper edge as follows:

$$\begin{aligned} F((x,y+0.5)) &= 2*(yb-ya)*(x-xa) - \\ &\quad 2*(xb-xa)*(y+0.5-ya) \\ &= 2*(yb-ya)*(x-xa) - \\ &\quad 2*(xb-xa)*(y-ya) - \\ &\quad 2(xb-xa)(0.5) \end{aligned}$$

Thus, $F(x,y+0.5) = F(x,y) - (xb-xa)$

Similarly, yb−ya is subtracted from the decision variables for the right edge and is added to the decision variables for the left edge.

If the decision variables for P0 and P1 have opposite signs, then the scissored point can be found by the method described above. In block 46, the midpoint (Pm) between P0 and P1 is calculated by adding the appropriate coordinates and dividing by two using a right shift of one bit. The decision variable for the midpoint (DPm) is also calculated. If, in decision block 48, the decision variable associated with the midpoint Pm is equal to zero (or is less than a predetermined threshold), then the intersection point is equal to the midpoint. An appropriate adjustment is made so that the point matches a Bresenham step in block 50 and the decision variable is adjusted prior to adding e0 to determine the Bresenham error e in block 52. The line is then drawn in block 32.

If DPm is not equal to zero, then one of the possible points of intersection, P0 or P1, is set to the midpoint in blocks 54–58. In decision block 54, the decision variables DP0 and DP1 are compared to determine which point P0 or P1 is furthest from the point of intersection in block 56. If DP1 is not greater than DP0, then P0 is set to Pm and DP0 is set to the DPm. Otherwise, P1 is set to Pm and DP1 is set to the DPm in block 58.

In block 60, it is determined whether further iterations can be made. If the distance between the two point P0 and P1 is equal to one, then no further iterations can be made and the closest point to the point of intersection is chosen in blocks 62–66. Otherwise, flow is returned to block 46 and the iterations continue. In block 62, the decision variables associated with P0 and P1 are compared to determine which point is closer to the point of intersection. If DP0 is less than DP1, then P0 is closer, and is chosen as the intersection point in block 64. Otherwise, P1 is chosen as the intersection point in block 66. If DP0=DP1, a decision must be made as to which point should be selected as the point of intersection. If the major axis is parallel with the clip segment, both points are on the Bresenham line and an arbitrary decision can be made. If the major axis is normal with the clip segment, then the decision made should match the Bresenham algorithm being implemented.

In block 52, the decision variable is adjusted for the chosen intersection point and the Bresenham error term is calculated by adding e0 to the adjusted decision variable.

Figure 7:
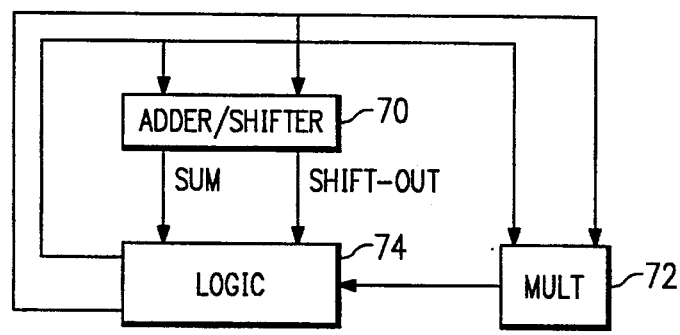
FIG. 7 illustrates a block diagram of the circuitry for determining the point of intersection.

FIG. 7 illustrates a block diagram for a general architecture for determining the point of intersection. The circuitry includes an adder/shifter 70 and a multiplier 72 coupled to logic 74. The adder/shifter 70 and multiplier 72 may be shared with other portions of the line draw engine and may be implemented, for example, in a programmable array logic. The adder/shifter 70 and multiplier 72 perform the decision variable and midpoint calculations. The logic 74 controls the adder/shifter 70 and multiplier 72 as described in connection with the flow charts of FIGS. 3 and 6.

The present invention provides significant advantages over the prior art. Importantly, the scissor points may be determined without division circuitry of long division calculations. Further, the method allows the error term of the point of intersection to be determined by a simple addition after the point of intersection is determined.

Although the preferred embodiment has been described in detail, it should be noted that various changes, substitutions and alterations could be made herein without departing from the spirit and scope of the invention as defined by the appended claims.

What is claimed is:

1. A method of generating pixels in a computer representing a segment of a line relative to a predefined rectangle on a computer display, comprising the steps of:

determining, in the computer, whether one or more edges of the rectangle intersect the segment of the line and whether the coordinates of the corners of the rectangle defining an angle are disposed on opposite sides of the segment of the line, and further includes the steps of:

calculating a biased decision variable for the coordinates of each corner of the rectangle, said decision variable having a sign relative to the sign side of the line on which the corner of the rectangle is positioned; and comparing the signs of the decision variable for two corners;

if one or more edges of the rectangle are intersected by the segment of the line, determining, in the computer, the point of intersection on at least one of the edges of the rectangle by iteratively halving the distance between two points of an edge of the rectangle which is intersected by the segment of the line, where said two points are positioned on either side of the segment of the line; and drawing the segment of the line using the point of intersection on at least one of the edges of the rectangle as an endpoint.

2. The method of claim 1 wherein said step of determining the point of intersection includes the steps of:

setting said two points of the edge of the rectangle to the coordinates of the corners defining the edge of the rectangle which is intersected;

calculating a decision variable for each of said two points of the edge of the rectangle, said decision variable for each point having a magnitude relative to the distance of the respective point from the line; and repeating the steps of:

determining a point of the edge of the rectangle furthest from the line based on the respective magnitudes of said decision variable for each of said two points;

resetting the point furthest from the line to a position midway between the locations of the current points; and calculating the decision variable for the point which was reset;

until a predetermined condition is met.

3. The method of claim 2 wherein said repeating step comprises the step of repeating said steps of determining the point furthest from the line, resetting and calculating the decision until the decision variable for at least one of said points is within a predetermined threshold.

4. The method of claim 2 wherein said repeating step comprises the step of repeating said steps of determining the point furthest from the line, resetting and calculating the decision until the coordinates for the two points are within a predetermined threshold.

5. The method of claim 4 wherein said step of determining the point of intersection further comprises the step of determining which point is closer to the point of intersection after the two points are within said given threshold.

6. The method of claim 3 and further comprising the step of calculating an error term based on the decision variable associated with the point closer to the point of intersection.

7. The method of claim 4 wherein said step of resetting the point comprises the step of adding corresponding coordinates of the current points and right-shifting the sum by one bit.

8. The method of claim 7 wherein said step of calculating the decision variable for the reset point comprises the step of calculating the sum of the decision variables associated with the current points and right shifting the sum by one bit.

9. The method of claim 7 and further comprising the step of adjusting the value of the decision variable associated with one of the points responsive to the value of the shifted bit.

10. The method of claim 1 wherein said step of calculating a biased decision variable comprises the step of calculating a decision variable for each point as offset by a half-step in a predetermined direction associated with said one edge.

11. Circuitry for drawing a segment of a line relative to a predefined rectangle on a computer display, comprising the steps of:

circuitry for determining whether one or more edges of the rectangle intersect the segment of the line and whether the coordinates of the corners of the rectangle defining an angle are disposed on opposite sides of the segment of the line, and further includes:

circuitry for calculating a biased decision variable for the coordinates of each corner of the rectangle, said decision variable having a sign relative to the sign side of the line on which the corner of the rectangle is positioned; and circuitry for comparing the signs of the decision variable for two corners circuitry for determining the point of intersection on at least one of the edges of the rectangle by iteratively halving the distance between two points of an edge of the rectangle which is intersected by the segment of the line, where said two points are positioned on either side of the segment of the line; and circuitry for drawing the segment of the line using the point of intersection on at least one of the edges of the rectangle as an endpoint.

12. The circuitry of claim 11 wherein said repeating circuitry comprises circuitry of repeating said circuitry for determining the point furthest from the line, resetting and calculating the decision until the decision variable for at least one of said points is within a predetermined threshold.

13. The circuitry of claim 11 wherein said repeating circuitry comprises circuitry of repeating said circuitry for determining the point furthest from the line, resetting and calculating the decision until the coordinates for the two points are within a predetermined threshold.

14. The circuitry of claim 13 wherein said circuitry for determining the point of intersection further comprises circuitry for determining which point is closer to the point of intersection after the two points are within said given threshold.

15. The circuitry of claim 14 and further comprising circuitry for calculating an error term based on the decision variable associated with the point closer to the point of intersection.

16. The circuitry of claim 12 wherein said circuitry for resetting the point comprises circuitry for adding corresponding coordinates of the current points and right-shifting the sum by one bit.

17. The circuitry of claim 16 and further comprising circuitry for adjusting the value of the decision variable associated with one of the points responsive to the value of the shifted bit.

18. The circuitry of claim 12 wherein said circuitry for calculating the decision variable for the reset point comprises circuitry for calculating the sum of the decision variables associated with the current points and right shifting the sum by one bit.

19. The circuitry of claim 1 wherein said circuitry for calculating a biased decision variable comprises the circuitry for calculating a decision variable for each point as offset by a half-step in a predetermined direction associated with said one edge.

20. Circuitry for drawing a segment of a line relative to a predefined rectangle, comprising:

circuitry for determining whether one or more edges of the rectangle intersect the segment of the line and whether the coordinates of the corners of the rectangle defining an edge are disposed on opposite sides of the segment of the line, and further including:

circuitry for calculating a decision variable for the coordinates of each corner of the rectangle, said decision variable having a sign relative to the side of the line on which the corner is positioned; and circuitry for comparing the signs of the decision variables for two corners;

circuitry for determining the point of intersection on at least one of the edges of the rectangle by iteratively halving the distance between two points of at least one of the edges of the rectangle if one or more edges are determined to intersect the segment of the line; and circuitry for drawing the line using the point of intersection on at least one of the edges of the rectangle as an endpoint.

21. The circuitry of claim 20 wherein said circuitry for determining the point of intersection on at least one of the edges of the rectangle includes:

circuitry for setting said two points to the coordinates of the corners defining the edge of the rectangle which is intersected;

circuitry for calculating a decision variable for each of said two points, said decision variable for each point having a magnitude relative to the distance of the respective point from the line; and resetting circuitry for iteratively determining a point furthest from the line based on the respective magnitudes of the decision variable for each of said two points, resetting the point furthest from the line to a position midway between the locations of the current points and calculating the decision variable for the point which was reset until a predetermined condition is met.

22. The circuitry of claim 21 wherein said resetting circuitry includes circuitry for iteratively determining a point furthest from the line based on the respective magnitudes of said decision variables for each of said two points, resetting the point furthest from the line to a position midway between the locations of the current points and calculating the decision variable for the reset endpoint until the decision variable for at least one of said points is within a predetermined threshold.

23. The circuitry of claim 21 wherein said resetting circuitry includes circuitry for iteratively determining a point furthest from the line based on the respective magnitudes of the decision variable for each of said two points, resetting the point furthest from the line to a position midway between the locations of the current points and calculating the decision variable for the reset endpoint until the coordinates for the two points are within a predetermined threshold.

24. The circuitry of claim 23 wherein said circuitry for determining the point of intersection further comprises circuitry for determining which point is closer to the line after the coordinates for the two points are within said given threshold.

25. The circuitry of claim 24 and further comprising circuitry for calculating an error term based on the decision variable associated with the point closer to the line.

26. The circuitry of claim 21 wherein said circuitry for resetting the point comprises circuitry for adding corresponding coordinates of the current points and right-shifting the sum by one bit.

27. The circuitry of claim 21 wherein said calculating circuitry comprises circuitry for calculating the sum of the decision variables associated with the current points and right shifting the sum by one bit.

28. The circuitry of claim 27 and further comprising circuitry for adjusting the value of the decision variable associated with one of the points responsive to the value of the shifted bit.

29. The circuitry of claim 21 wherein said calculating circuitry comprises circuitry for calculating a biased decision variable.

30. The circuitry of claim 29 wherein said circuitry for calculating a biased decision variable comprises circuitry for calculating a decision variable for each point as offset by a half-step in a predetermined direction associated with said one edge.

* * * * *

UNITED STATES PATENT AND TRADEMARK OFFICE
CERTIFICATE OF CORRECTION

PATENT NO. : 5,594,848
DATED : January 14, 1997
INVENTOR(S) : Giang H. Dao

It is certified that error appears in the above-indentified patent and that said Letters Patent is hereby corrected as shown below:

Col. 8, line 1, delete "claim 3", insert --claim 5--.

Signed and Sealed this

Eighth Day of April, 1997

Attest:

BRUCE LEHMAN

Attesting Officer

Commissioner of Patents and Trademarks